May 8, 1956  K. RÖBEN  2,744,496
ADJUSTABLE MILKING MACHINE CUPS
Filed July 15, 1952
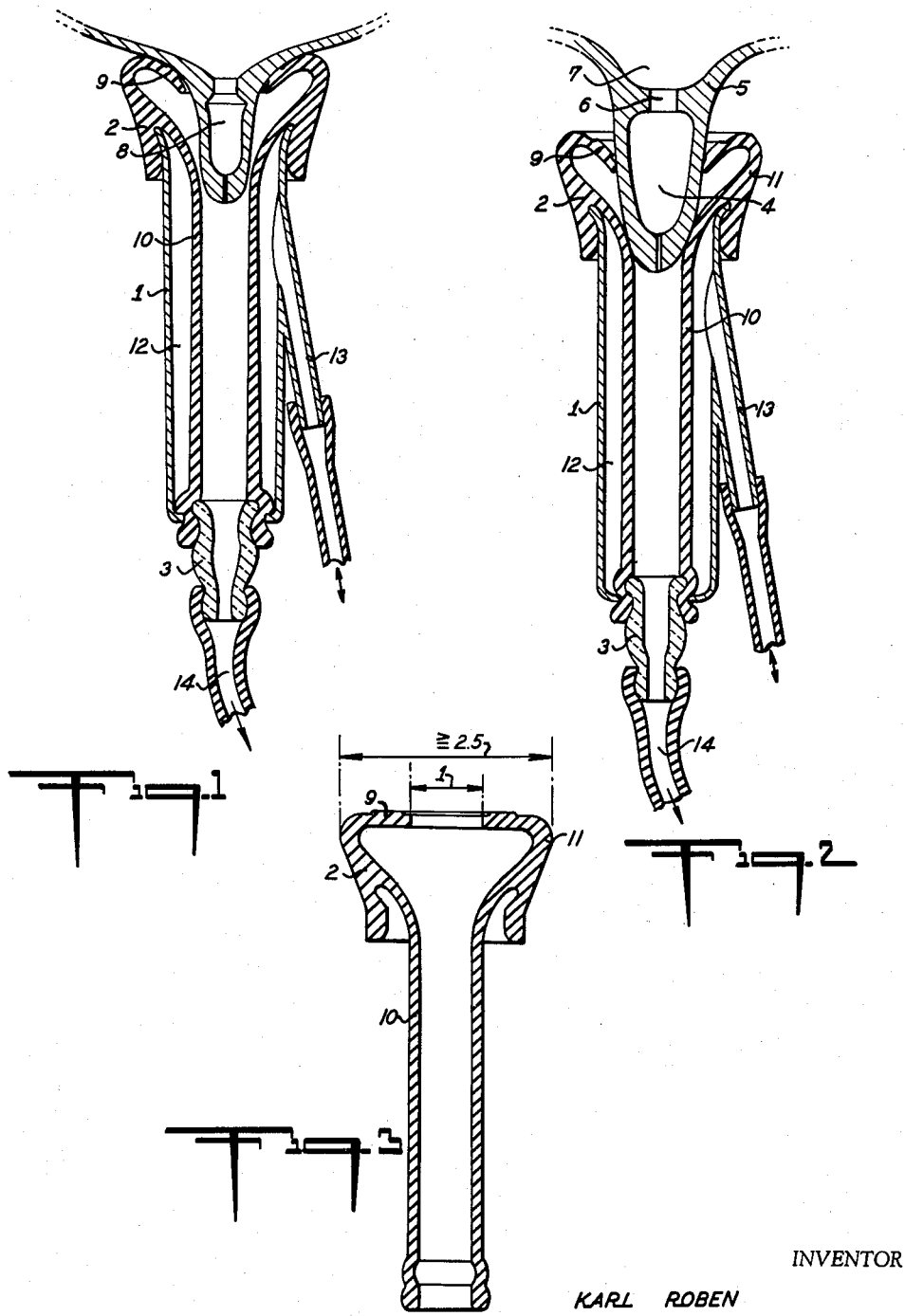
INVENTOR
KARL ROBEN
BY *Burgess & Dinklage*
ATTORNEY

United States Patent Office 2,744,496
Patented May 8, 1956

2,744,496
ADJUSTABLE MILKING MACHINE CUPS

Karl Röben, Oelde, Westphalia, Germany, assignor to Westfalia Separator AG., Oelde, Germany, a corporation of Germany Application July 15, 1952, Serial No. 298,931

Claims priority, application Germany July 23, 1951

2 Claims. (Cl. 119—14.47)

This invention relates to improvements in milking machine teat cups. It more particularly relates to the shaped, flexible portion of a double compartment teat cup of a milking machine.

Double compartment teat cups of milking machines consist of a rigid cup shell, such as a metal cup shell, and a flexible or shaped portion extending through the cup shell and generally constructed of molded rubber. This shaped, flexible portion, usually constructed of molded rubber, will be referred to herein as the shaped part of the teat cup.

In operation, one end of the shaped part of the teat cup is placed over the teat to be milked and adheres thereto by means of suction which is applied to the other end of the shaped part. The milking itself is effected by subjecting the annular space between the cup shell and the shaped part to pulsations of atmospheric air and of suction from the milking machine.

The milking capacity of the machine, i. e., the quantity of milk which may be obtained per unit of time, is substantially influenced by the design of the teat cup and by the shape of the teat and its condition inside the cup. The teats of different cows vary widely in respect to diameter, length, distance apart and distance from the root. Certain changes also occur in the udder and teats during the milking. These variations and changes make it extremely difficult to find the most favorable single size and shape for the shaped part of the teat cups of milking machines which are used to milk a number of cows. This difficulty is further exaggerated by the fact that in many cows there is a constriction on the inside of the teat near the root which may prevent the milk from flowing out of the udder. Such an obstruction of the flow of milk can easily occur if the teat cups move higher up on the teats during the milking pulsations of the milking machine, and finally reach the portion of the teat where the constriction occurs and shut off the further flow of milk after the udder, for example, has only been half emptied. This disadvantage is quite common when using teat cups of the known and conventional design. It is, of course, possible to make the upper opening of the shaped portion which is pushed over the teat larger in the case of thick teats in order to avoid this disadvantage. However, if this is done, these teat cups will not adhere and milk properly when used on thin teats, and will disturb the milking operation.

One object of this invention is a construction for the shaped part of double compartment teat cups of milking machines which will avoid these disadvantages and which may be used satisfactorily on teats of the most varied dimensions. This and still further objects will become apparent from the following description, read in conjunction with the drawing, in which:

Fig. 1 shows a vertical section of a teat cup in accordance with the invention being used on a thin teat;

Fig. 2 shows a vertical section of the teat cup shown in Fig. 1 being used on a thick teat; and Fig. 3 shows a central vertical section of the teat cup shown in Fig. 1 without being placed on a teat.

In accordance with the invention, the shaped part for the double compartment teat cup of milking machines is constructed so that the portion which is slipped over the teat and which will be referred to as the head portion, has a ratio of its outer diameter to its opening of at least 2.5:1. The head portion of the shaped part is so constructed with respect to wall thickness and shape that the teat cup will adhere in a dependable manner to thin teats, and yet, when used on thick teats, the opening will automatically widen in such a manner that no pressure to cause constriction within the teat is effected. The shape is such that the lip of the head portion will be pushed inward and the head portion will rest tightly, and yet softly, against the teat and udder.

It has been found that an exceptionally good seating or adherence of the teat cup to the teat is effected if the portion of the head of the shaped part between the lip defining the opening and the tubular lower portion of the shaped part is made conical and substantially stiffer than the lip.

The invention can be better understood with reference to the drawings. The double compartment teat cup consists of the rigid teat cup shell 1, as, for example, a metal teat cup shell, the flexible or elastic shaped portion 2, referred to as the shaped part, which consists of the parts 9, 10 and 11, and the sight or foam glass 3 developed as a tube connection. A suction tube 14 is attached to the sight or foam glass 3, and suction from the milking machine is applied to this tube 14. A tube 13 defines a passage into the teat cup shell 1 in communication with the hollow annular space 12 between the shell 1 and the tubular portion 10 of the shaped part 2. Pulsations of air and suction from the milking machine are effected through the tube 13, which causes the milking proper.

In accordance with the invention, the shaped part 2 consists of the lip 9 defining an opening for the insertion of the teat, the widened portion 11 and the tubular portion 10. The ratio of the widest diameter of the portion 11 to the opening defined by the lip 9 must be at least 2.5:1. The lip portion 9 is relatively thin-walled, and flexible, and bends inwardly so that the head portion will be seated and adhere to the teat in a dependable manner, regardless of the size of the teat. The seating is also so effected that the lip 9 with its opening will be bent in to the head to a greater or lesser degree, depending on the thickness of the teat, and thus will automatically widen for thicker teats and will not cause pressure, which in turn, will cause a constriction of the teat.

Preferably, as shown, the portion 11 has a conical shape and is substantially stiffer than the lip portion 9 or the lower tubular portion 10.

As shown in Fig. 1, the teat cup is placed on an udder having relatively thick teats 4. The lip 9 will then curl over into the portion 11 as the opening defined by the lip 9 is inserted over the teat. This causes an automatic widening of the opening in the head portion, so that the cup adheres firmly, yet softly, and no contraction, which would cause an impedance of the milk flow occurs.

As compared to this, when using a teat cup of conventional construction, the molded portion would climb up during the milking and close the constriction 6 upon reaching the root of the teat 5, and thus prevent a further flow of milk out of the udder reservoir 7.

As shown in Fig. 2, the same teat cup is used on a much thinner teat 8. The lip portion 9 is not bent or curled into the portion 11 to the extent as was shown in Fig. 1 when used on thick teats. Thus, the molded part adjusts itself to these small teats and adheres and seats itself in a very dependable manner.

As compared with this, a conventional teat cup would not so adhere if its opening was made large enough to be used on thick teats.

The invention thus essentially comprises a shaped part for doouble compartment teat cups of milking machines having a widened head portion with a flexible lip defining an opening, the ratio of the largest diameter of said head portion to the opening defined by said lip being at least 2.5:1, whereby the lip portion will bend inwardly on insertion of a teat and automatically adjust to the size thereof and seat thereon in a tight, soft manner.

I claim:

1. In a milking-machine teat-cup assembly having a double-compartment teat cup with a rigid outer cup shell; a shaped portion positioned in said outer cup shell having a widened portion of substantially conical form defining an annular chamber positioned axially past the edge of said rigid outer cup shell and of substantially greater cross-sectional width than the cup shell, and a flexible lip positioned substantially at right angles to the axis of the teat cup defining an opening in said widened portion with the ratio of the largest diameter of said widened portion to the diameter of said opening defined by said lip being at least 2.5:1, whereby, upon insertion of a teat, the flexible lip may bend into said widened annular chamber and automatically adjust to the shape and size of the teat.

2. In a milking-machine teat-cup assembly having a double-compartment teat cup with a rigid outer cup shell; a shaped portion positioned in said outer cup shell having a widened portion of substantially conical form defining an annular chamber positioned axially past the edge of said rigid outer cup shell and of substantially greater cross-sectional width than the cup shell, and a flexible lip positioned substantially at right angles to the axis of the teat cup defining an opening in said widened portion with said widened portion being substantially stiffer than said lip and with the ratio of the largest diameter of said widened portion to the diameter of said opening defined by said lip being at least 2.5:1, whereby, upon insertion of a teat, the flexible lip may bend into said annular chamber and automatically adjust to the shape and size of the teat.

References Cited in the file of this patent

UNITED STATES PATENTS

| | | |
|---|---|---|
| 827,160 | Lane | July 31, 1906 |
| 952,122 | Lane | Mar. 15, 1910 |
| 1,260,466 | Sharples | Mar. 26, 1918 |
| 2,502,956 | Jansson | Apr. 4, 1950 |
| 2,574,063 | Richwine | Nov. 6, 1951 |
| 2,612,136 | Davis | Sept. 30, 1952 |
| 2,687,112 | Shurts | Aug. 24, 1954 |